United States Patent
Berteche et al.

(10) Patent No.: US 9,595,078 B2
(45) Date of Patent: Mar. 14, 2017

(54) METHOD OF DISPLAYING A NEW RECTANGULAR WINDOW ON A SCREEN

(71) Applicant: ORANGE, Paris (FR)

(72) Inventors: Olivier Berteche, Bieville Beuville (FR); Nicolas Barthe, Esquay Notre Dame (FR); Jean-Noël Mathis, Authie (FR); Christophe Lemee, Bretteville sur Odon (FR)

(73) Assignee: Orange, Paris (FR)

(*) Notice: Subject to any disclaimer, the term of this patent is extended or adjusted under 35 U.S.C. 154(b) by 67 days.

(21) Appl. No.: 14/754,109

(22) Filed: Jun. 29, 2015

(65) Prior Publication Data
US 2015/0379686 A1 Dec. 31, 2015

(30) Foreign Application Priority Data
Jun. 30, 2014 (FR) .................................. 14 56218

(51) Int. Cl.
*G06T 3/20* (2006.01)
*G06F 9/44* (2006.01)
(Continued)

(52) U.S. Cl.
CPC .............. *G06T 3/20* (2013.01); *G06F 3/0483* (2013.01); *G06F 3/04815* (2013.01);
(Continued)

(58) Field of Classification Search
CPC ...... G06F 3/0485; G06F 3/04855; G06T 3/20
See application file for complete search history.

(56) References Cited

U.S. PATENT DOCUMENTS

2011/0055753 A1 3/2011 Horodezky et al.
2013/0067395 A1* 3/2013 Nishina ................. G06F 3/0485
715/784

(Continued)

FOREIGN PATENT DOCUMENTS

WO    WO 2009/143076 A2    11/2009

OTHER PUBLICATIONS

Hakala et al. 2005. Mobile photo browsing with pipelines and spatial cues. Human-Computer Interaction—Interact 2005 Lecture Notes in Computer Science, pp. 227-239. Berlin: Springer.
(Continued)

*Primary Examiner* — Jacinta M Crawford
*Assistant Examiner* — Jonathan M Cofino
(74) *Attorney, Agent, or Firm* — Knobbe Martens Olson & Bear LLP

(57) ABSTRACT

A method which serves to display a new rectangular window in a display zone on a screen, the display zone already including at least one first rectangular window, the new window being displayed progressively towards the inside and starting from an edge of the first window is disclosed. In one aspect, the method comprises shifting the content of the first window from the edge through a distance corresponding to the dimension of said new window in a second direction perpendicular to a first direction parallel to the edge. The method may also comprise displaying the new window along the edge, the display having the effect of correspondingly reducing said first window in the second direction and, once the entire new window has been displayed, managing the scrolling of the initial content in the first window.

12 Claims, 6 Drawing Sheets

(51) Int. Cl.
*G06F 3/0481* (2013.01)
*G06F 3/0483* (2013.01)
*G06F 3/0485* (2013.01)
*H04M 1/725* (2006.01)
*G06F 3/0488* (2013.01)
*G06T 3/40* (2006.01)
*G09G 5/34* (2006.01)

(52) U.S. Cl.
CPC ...... *G06F 3/04855* (2013.01); *G06F 3/04886* (2013.01); *G06F 9/4403* (2013.01); *G06T 3/40* (2013.01); *G09G 5/34* (2013.01); *H04M 1/725* (2013.01); *H04M 1/72544* (2013.01); *G06F 2203/04803* (2013.01)

(56) References Cited

U.S. PATENT DOCUMENTS

2013/0191775 A1 7/2013 Lawson et al.
2014/0317556 A1* 10/2014 Ellenich ................ G06F 3/0485
   715/784

OTHER PUBLICATIONS

French Search Report dated Feb. 25, 2015 for French Application No. FR 1456218 filed Jun. 30, 2014.

* cited by examiner

METHOD OF DISPLAYING A NEW RECTANGULAR WINDOW ON A SCREEN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. In particular, the disclosure of French Application 1456218, filed on Jun. 30, 2014, is incorporated by reference herein in its entirety.

BACKGROUND OF THE INVENTION

Some embodiments described herein relate to the field of graphics interfaces.

In the present state of the art, when it is desired to display new content on a screen, it is common practice to open a new window for that content.

Although that solution is most advantageous, it presents the drawback of masking the content that was previously displayed at the location occupied by the new window. In order to access the old content once more, the user can move the new window, thereby masking some other content, or the user can close the new window.

Some embodiments described herein provide a method of displaying content that does not present the above-mentioned drawbacks.

SUMMARY OF THE INVENTION

More precisely, some embodiments described herein provide a display method for displaying a new rectangular window in a display zone on a screen, the display zone including a first rectangular window, the new window being displayed progressively towards the inside and from an edge of the first window.

In other words, the new window is displayed progressively towards the inside of the zone initially occupied by the first window, starting from the initial location of an edge of the first window (i.e. the location before displaying the new window).

In some embodiments described herein, the method comprises processes for:

shifting the content of the first window from the edge through a distance corresponding to the dimension of the new window in a second direction perpendicular to a first direction parallel to the edge;

displaying the new window along the edge, the display having the effect of correspondingly reducing the first window in the second direction; and, once the entire new window has been displayed, a process for:

managing the scrolling of the initial content in the first window.

In a particular implementation, the method includes an optional process of subdividing the content of the new window into strips that are parallel to the above-mentioned edge. When the window is not subdivided, it is considered that it constitutes a single strip. For each of these strips, the method may comprise:

shifting the content of the first window from the above-mentioned edge through a distance corresponding to the dimension of the strip in a second direction perpendicular to the first direction;

displaying the strip of the new window along the edge, the display having the effect of correspondingly reducing the first window in the second direction; and, once the entire new window has been displayed, a process for:

managing the scrolling of the initial content in the first window.

In some embodiments described herein, the display method thus makes it possible to display one or more additional windows (or panes) while ensuring it is still possible to access all of the initial content of the first window by using a scrolling mechanism.

While the new window is being displayed, the content of the first window is generally shifted without being deformed.

This display method has a preferred but non-limiting application in the context of screens that are small in size and/or for which it is impossible to display simultaneously a plurality of windows without first acting on some characteristic of the current display, e.g. by masking or by redimensioning an already-displayed window while conserving its contents (i.e. deforming the content of said window, e.g. by reducing the size of the content).

As it deploys, the new window appears to push away the content of the first window, thereby reducing the first window correspondingly.

In a particular implementation, the dimension of the new window in a first direction parallel to said edge is greater than or equal to the dimension of this edge.

In one embodiment, the initial content of the window is not deformed.

In a preferred implementation, the initial content of the window is not redimensioned.

In a particular implementation, it is also possible to allow the content in the new window to scroll horizontally and/or vertically.

By displaying the new window as successive strips (possibly of one pixel width), the user is given the impression that the new window is being deployed.

In a particular implementation, said new window is subdivided into strips that are one pixel wide. This implementation enables the content of the new window to be displayed in a manner that is very progressive and not aggressive for the user.

In another implementation, the new window is subdivided into strips of increasing or decreasing size so as to create an effect of the display of this new window accelerating or decelerating.

In a particular implementation, said new window is displayed on detecting an open command.

In a particular implementation, the new window can be reclosed so as to recover the space occupied by the new window in order to redimension the first window.

More precisely, in this implementation, on detecting a close command, the display method comprises:

deleting the new window from the display zone; and
enlarging the first window via the above-mentioned edge and shifting its initial content along the second direction towards the edge through a distance corresponding to the dimension of the new window in the second direction.

In a particular implementation, the display zone has a plurality of first rectangular windows that are not superposed, optionally being juxtaposed.

In a particular implementation, the dimension of the new window along the second dimension is slightly smaller than the same dimension of a first window.

Thus, when the new window deploys, the first window that is furthest away from among all these displayed first windows is deleted over almost its entire area, giving the impression that it is leaving the screen progressively as though it were being pushed by the new window. The strip of this first window that still remains visible serves to remind the user of the initial content to which the user can gain access by scrolling.

In a particular implementation, the new window includes a menu suitable for causing new contents to be displayed in the first window.

Some embodiments described herein also provide a display device for displaying a new rectangular window in a display zone on a screen, the display zone already including at least one first rectangular window, the new window being displayed progressively towards the inside and starting from an edge of the first window. The device comprising a processor or a component configured to:

shift the content of the first window from the edge through a distance corresponding to the dimension of the new window in a second direction perpendicular to the first direction parallel to the edge;

display the new window along the edge, the display having the effect of correspondingly reducing the first window in the second direction; and, once the entire new window has been displayed, and a processor or a component configured to:

manage the scrolling of the initial content in the first window.

In a particular implementation, the various processes of the display method are determined by computer program instructions.

Consequently, some embodiments described herein provide a computer program on a data medium, the program including instructions for executing said processes of a display method as mentioned above, when the instructions are executed by a computer.

Some embodiments described herein also provide a computer program on a data medium including instructions for executing said processes of a display method as mentioned above when the instructions are executed by a display device as mentioned above.

These programs may use any programming language, and may be in the form of source code, object code, or code intermediate between source code and object code, such as in a partially compiled form, or in any other desirable form.

Some embodiments described herein also provide a computer readable data medium including instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. In some embodiments, the program may in particular be downloaded from an Internet type network.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the embodiments described herein appear in the light of the following description made with reference to the accompanying drawings, in which.

DETAILED DESCRIPTION OF THE PREFERRED EMBODIMENT

Figure 1A:
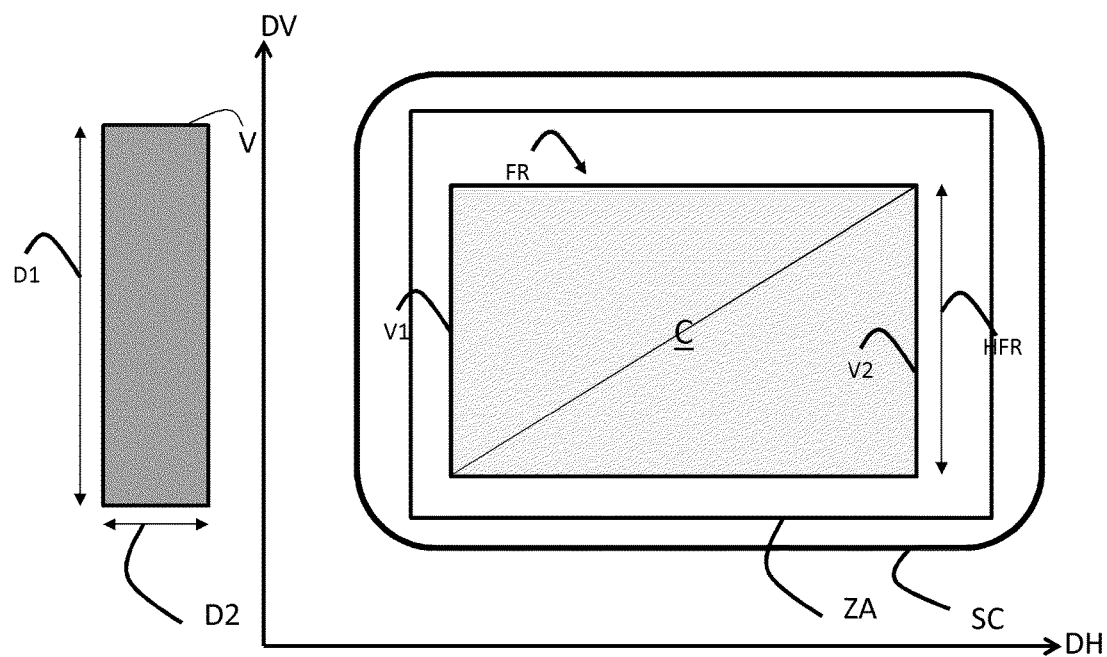
FIGS. 1A to 1C show an exemplary implementation of one embodiment.
Figure 1B:
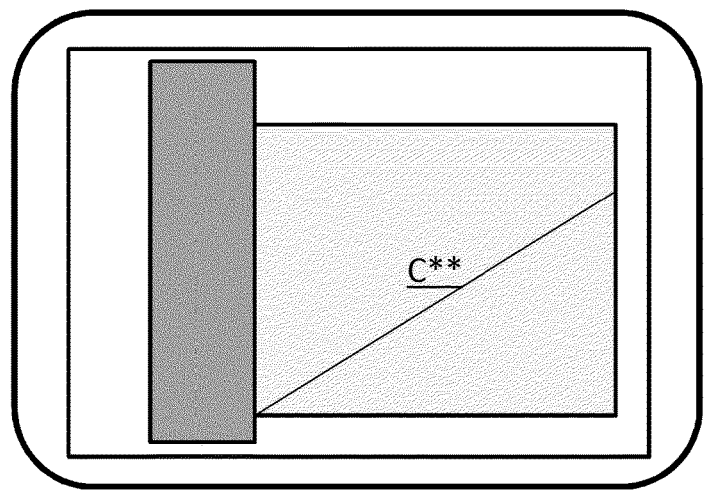
Figure 1C:
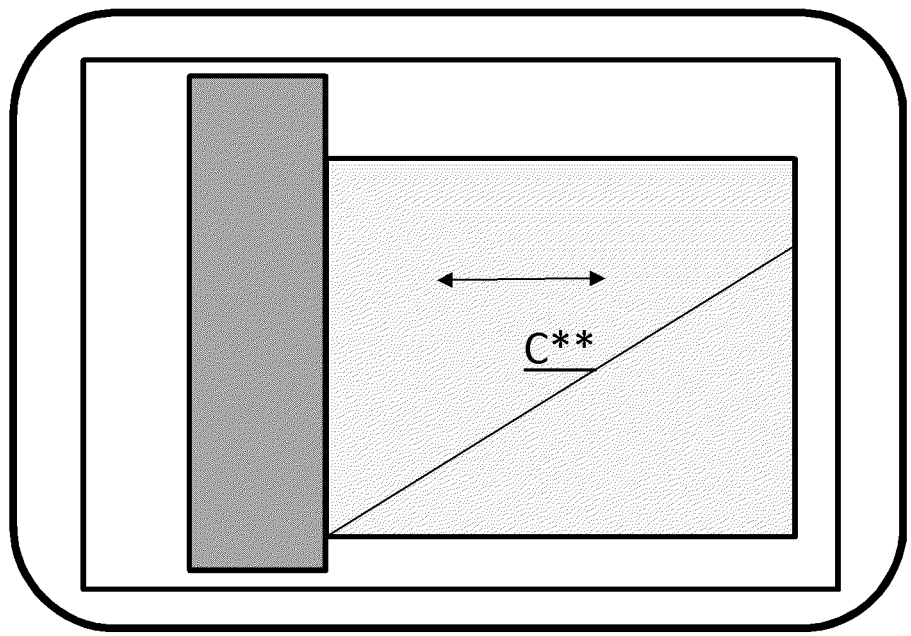

FIGS. 1A to 1C show an exemplary embodiment.

FIG. 1A shows a computer screen SC having a display zone ZA displaying a first rectangular window FR, with the initial content of this window being referenced C.

Reference HFR designates the height of the window, DV the vertical direction, and DH the horizontal direction.

In this example it is assumed that it is desired to display a first new rectangular window V with it being deployed horizontally in progressive manner starting from a vertical edge V1 of the first window FR and going towards the inside of this first window. i.e. going towards V2, the vertical edge opposite from V1.

In this example, the vertical dimension D1 of this new window V is greater than the dimension HFR of the edge V1. The horizontal dimension of this new window is written D2.

FIG. 1B shows the result of this display process: the new window V has pushed the content C of the first window horizontally, without resizing it, through a distance D2, such that a new content C** is displayed in the first window. The horizontal dimension of the first window FR is reduced correspondingly, i.e. by the width D2.

FIG. 1C shows that it is possible to access the entire initial content of the first window by scrolling this content. As the initial content scrolls to the left, this mechanism gives the impression that the initial content is sliding under the new window V.

In the presently-described implementation, the scrolling of the content in the new window V is not possible. This content is said to be "frozen".

Alternatively, it is possible to perform horizontal and/or vertical scrolling in the new window.

In order to display the new window in progressive manner, the content of the new window V is subdivided, during a process E20, into strips BV that are parallel to the edge V1, there being three of them in this example. This subdivision is not performed if the new window V is to be displayed as a whole.

Figure 2:
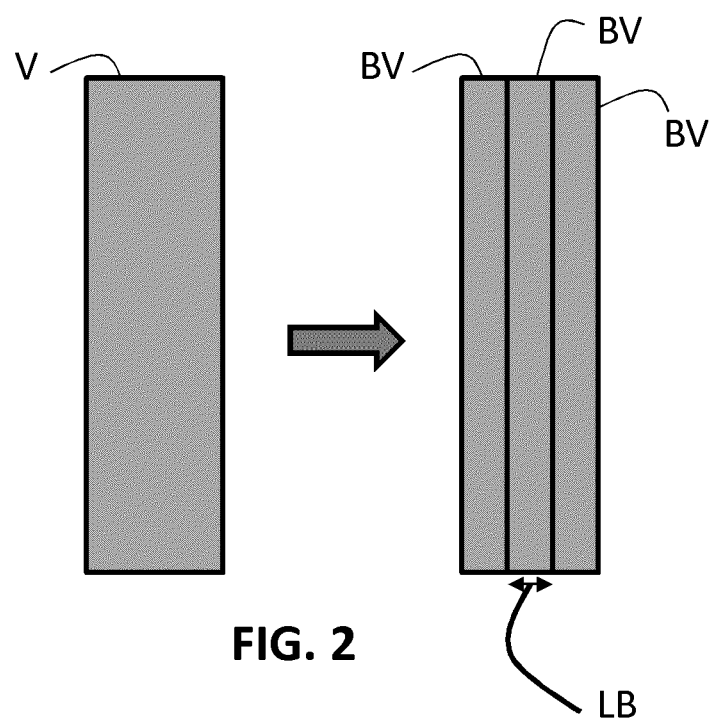
FIG. 2 shows a new window being subdivided into parallel strips.

FIG. 2 shows this subdivision in the particular, but optional, situation in which the strips all have the same width LB.

Figure 3A:
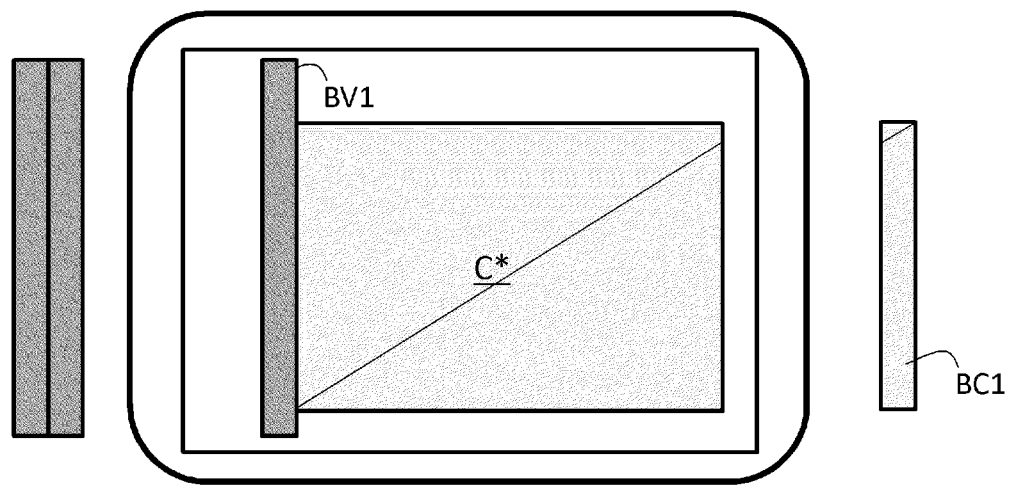
FIGS. 3A to 5 show the content of a screen after different processes of an exemplary method of displaying two new windows in accordance with one embodiment.

FIG. 3A shows the result of the method after displaying the first strip BV1 in the new window. It can be seen:

that a rectangular strip BC1 of the initial content C of the first window is no longer displayed. The content of this strip BC1 is stored, as is the position of this strip in the initial content (process E30) in order to be able to access to all of the initial content C by scrolling;

that the initial content C has been shifted (process E40) in the horizontal direction DH, starting from the edge V1 through a distance corresponding to the horizontal dimension LB of the strip BV1;

that the strip BV1 has been displayed along the vertical edge V1 (process E50); and that the initial content C can be reconstituted from the displayed content C* plus the content of the strip BC1.

Figure 3B:
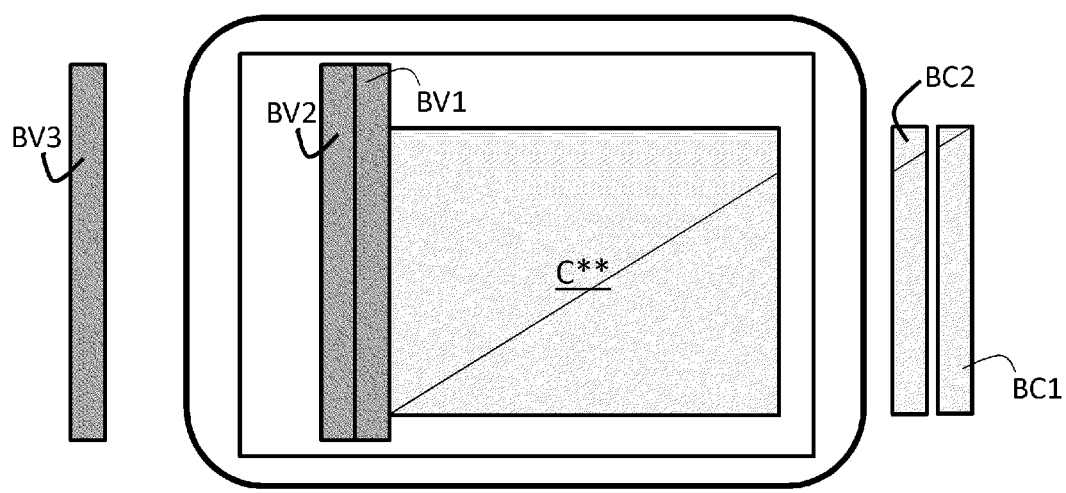

FIG. 3B shows the result of the method after displaying the second strip BV2 of the new window V, with a second strip BC2 of the initial content C being removed from the screen and stored together with its position in the initial content.

The initial content C can thus be reconstituted from the displayed initial content C** plus the content of the strips BC1 and BC2.

Figure 3C:
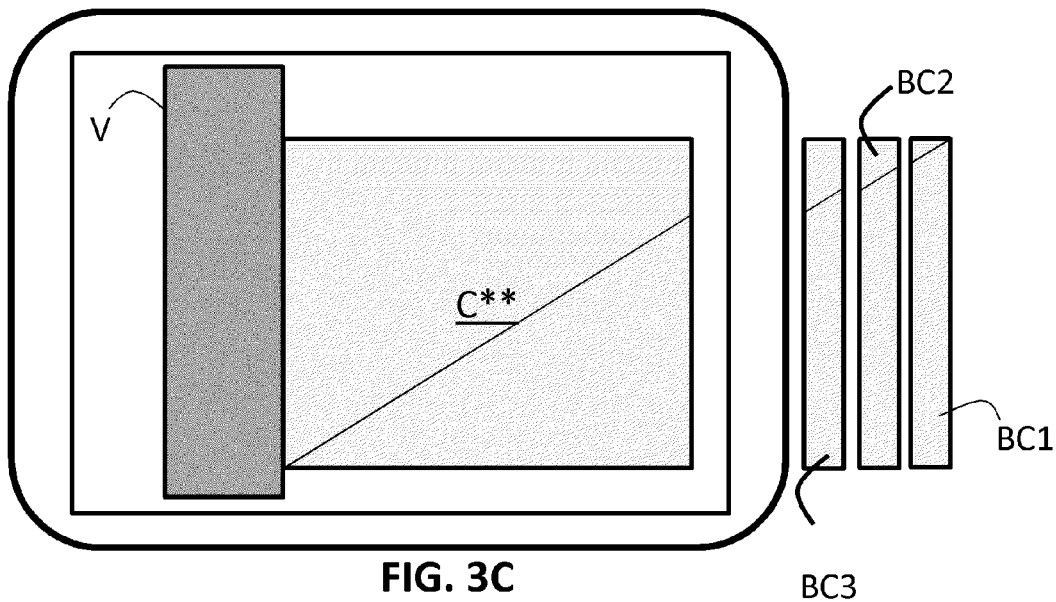

FIG. 3C shows the result of the method after displaying the third strip BV3 of the new window V. This figure is identical to FIG. 3B, except that it also shows the third strip BC3 of the initial content as stored.

Figure 4:
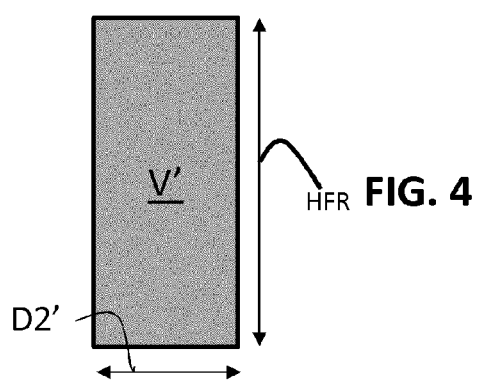

It is now assumed that it is desired to display a new rectangular window V' as shown in FIG. 4, having height HFR and width D2', along the edge V2 of the window FR.

In this example, this new window V' is displayed as a whole and it is therefore not subdivided.

Figure 5:
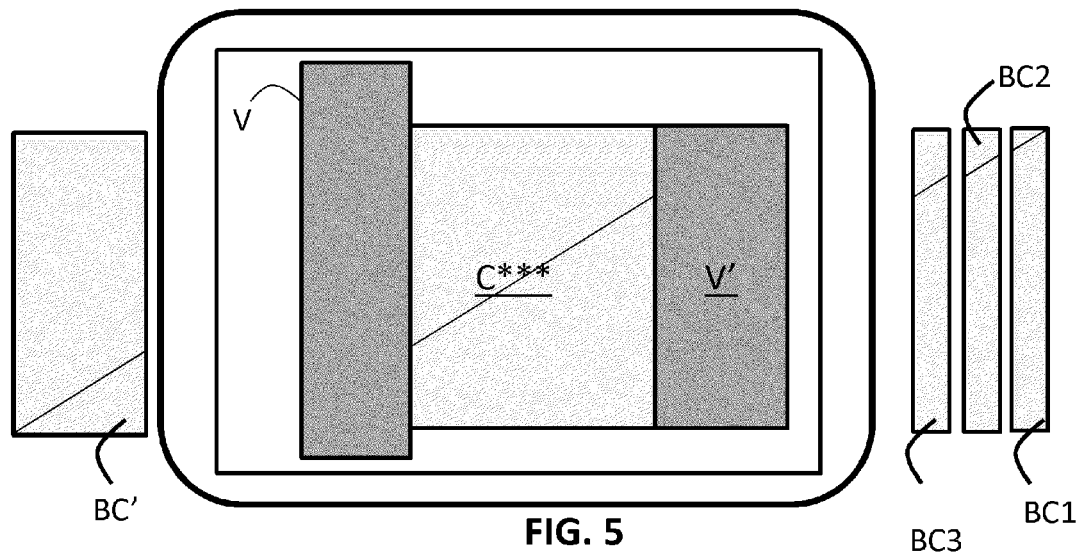
Figure 6:
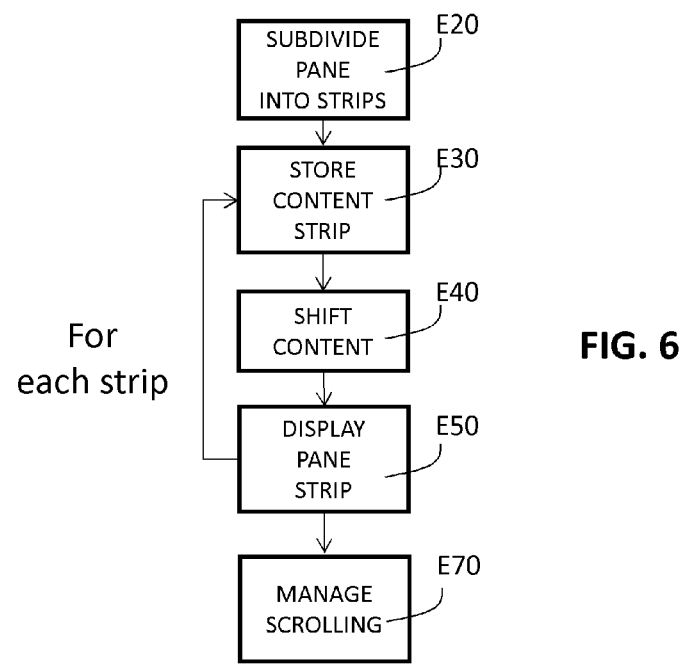
FIG. 6 is in the form of a flow chart showing the main processes of a display method in accordance with an exemplary embodiment.

FIG. 5 shows the result of the method after displaying this new window V'. It can be seen:

that the content of the first window FR has been scrolled horizontally from the edge V2 through a distance corresponding to the width D2' of the new window V'. This gives the illusion of the content sliding under the window V;

that the width of the first window FR has been reduced by this width D2';

that a rectangular strip BC' of the initial content of the window FR, of width D2' and masked by the window V, is stored (together with its position in the initial content); and that the new window V' is displayed along the vertical edge V2.

In accordance with some embodiments described herein, the initial content of the first window FR, in other words the content C*** displayed on the screen, plus the stored strips of content (BC1, BC2, BC3, BC') can scroll between the new windows V and V'.

Figure 7:
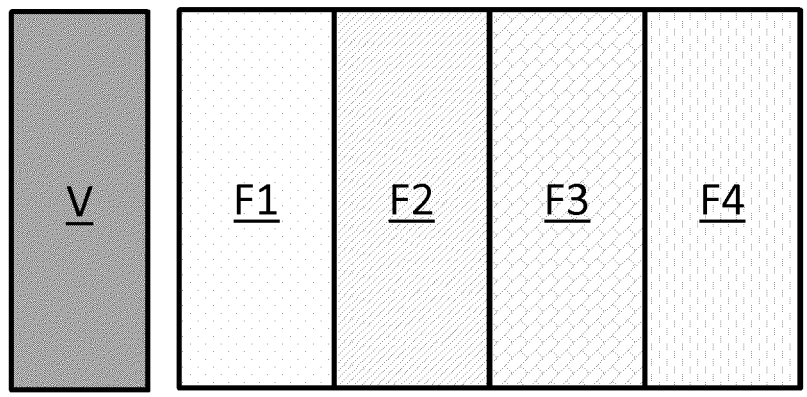
FIGS. 7 to 9 show an exemplary implementation of one embodiment in which the content is contained in a plurality of juxtaposed windows.
Figure 8:
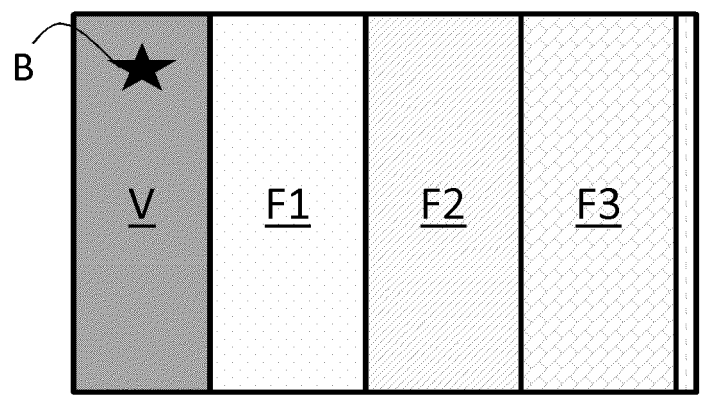

FIG. 7 shows a display zone having four rectangular windows F1 to F4 that have the same dimensions and that are juxtaposed, and FIG. 8 shows the content of the display zone after displaying a new window V of width slightly smaller than the width of any one of these windows.

It can be seen in this figure that the windows F1 to F4 are shifted and only a small strip of the window F4 remains visible.

Figure 9:
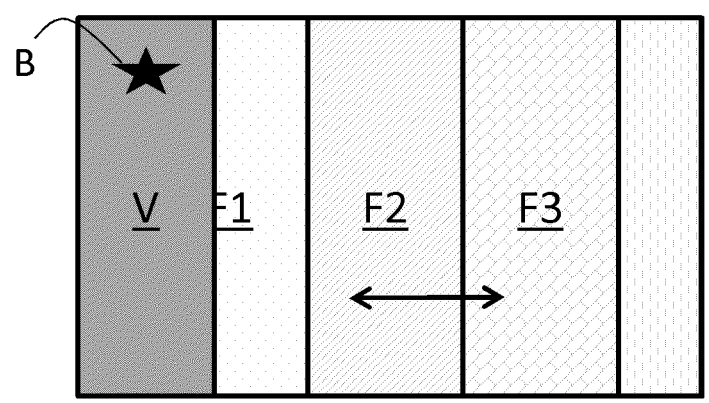

This small strip encourages the user to cause the displayed content to scroll in order to gain access to the entire content as shown in FIG. 9, the content giving the impression of sliding under the new window V during this scrolling.

Thus, in the above-described implementation, the shift, display, and management processes apply to the entity constituted by the plurality of windows F1 to F4.

In the presently-described implementation, the new window V starts deploying as soon as the user double clicks on one of the windows.

In the presently-described implementation, on being deployed, the new window V includes a button B, and pressing on the button has the effect of closing the new window V and returning to the state of FIG. 7.

It should be recalled that in accordance with some embodiments described herein, the new window deploys progressively, or else displays directly from the edge of an already-displayed first window. In a particular implementation described herein, this new window may have a menu enabling the user to cause new contents to be displayed in the first window.

Some embodiments described herein can be used in particular in an application to reading music files. For example, a first window may contain metadata about a music album; on clicking on that window, a new window having a reader deploys, encroaching on the first window, while still allowing access to all of the metadata by scrolling.

A command available in the new window may make it possible, in a particular implementation, to change the album displayed in the first window.

While the foregoing is directed to aspects of the present disclosure, other and further aspects of the disclosure may be devised without departing from the basic scope thereof, and the scope thereof is determined by the claims that follow.

What is claimed is:

1. A display method for displaying a new rectangular window in a display zone on a screen, said display zone already including at least one first rectangular window, the new window being displayed progressively towards the inside and starting from an edge of the first window, the method comprising:

shifting the content of the first window from said edge through a distance corresponding to the dimension of said new window in a second direction perpendicular to a first direction parallel to said edge;

displaying the new window along said edge, the display having the effect of correspondingly reducing said first window in said second direction; and once the entire new window has been displayed, managing the scrolling of the initial content in the first window; said method further comprising:

subdividing said new window into at least one strip parallel to said edge; and for each of said strips:

shifting the content of the first window from said edge through a distance corresponding to the dimension of said strip in said second direction; and displaying the strip of the new window along said edge.

2. A method according to claim 1, wherein the dimension of the new window in a first direction parallel to said edge is greater than or equal to the dimension of this edge.

3. A method according to claim 1, wherein said new window is subdivided into strips that are one pixel wide.

4. A method according to claim 1, wherein said new window is subdivided into strips of increasing or decreasing size.

5. A method according to claim 1, wherein said new window is displayed on detecting an open command.

6. A method according to claim 1, wherein, on detecting a close command, the method comprises:

deleting said new window from said display zone; and enlarging the first window via said edge and shifting its initial content along said second direction towards said edge through a distance corresponding to the dimension of said new window in said second direction.

7. A method according to claim 1, wherein said display zone has a plurality of first rectangular windows that are not superposed.

8. A method according to claim 7, wherein the dimension of said new window along said second dimension is slightly smaller than the same dimension of said first window.

9. A method according to claim 1, wherein said new window includes a menu suitable for causing new contents to be displayed in the first window.

10. A computer having stored thereon instructions for performing a method for displaying a new rectangular window in a display zone on a screen, said display zone already including at least one first rectangular window, the new window being displayed progressively towards the inside and starting from an edge of the first window when the instructions are executed by the computer, wherein execution of the instructions by the computer causes the computer to:

shift the content of the first window from said edge through a distance corresponding to the dimension of said new window in a second direction perpendicular to a first direction parallel to said edge;

display the new window along said edge, the display having the effect of correspondingly reducing said first window in said second direction; and once the entire new window has been displayed, manage the scrolling of the initial content in the first window; and wherein execution of the instructions by the computer further causes the computer to:

subdivide said new window into at least one strip parallel to said edge; and for each of said strips:

shift the content of the first window from said edge through a distance corresponding to the dimension of said strip in said second direction; and display the strip of the new window along said edge.

11. A non-transitory computer readable data medium having stored thereon instructions for performing a method for displaying a new rectangular window in a display zone on a screen, said display zone already including at least one first rectangular window, the new window being displayed progressively towards the inside and starting from an edge of the first window wherein execution of the instructions by a computer causes the computer to:

shift the content of the first window from said edge through a distance corresponding to the dimension of said new window in a second direction perpendicular to a first direction parallel to said edge;

display the new window along said edge, the display having the effect of correspondingly reducing said first window in said second direction; and once the entire new window has been displayed, manage the scrolling of the initial content in the first window; and wherein execution of the instructions by the computer further causes the computer to:

subdivide said new window into at least one strip parallel to said edge; and for each of said strips:

shift the content of the first window from said edge through a distance corresponding to the dimension of said strip in said second direction; and display the strip of the new window along said edge.

12. A display device for displaying a new rectangular window in a display zone on a screen, said display zone already including at least one first rectangular window, the new window being displayed progressively towards the inside and starting from an edge of the first window, said device comprising a processor configured to:

shift the content of the first window from said edge through a distance corresponding to the dimension of said new window in a second direction perpendicular to a first direction parallel to said edge;

display the new window along said edge, the display having the effect of correspondingly reducing said first window in said second direction; and once the entire new window has been displayed, manage the scrolling of the initial content in the first window;

wherein said processor is further configured to subdivide said new window into at least one strip parallel to said edge; and for each of said strips to:

shift the content of the first window from said edge through a distance corresponding to the dimension of said strip in said second direction; and display the strip of the new window along said edge.

\* \* \* \* \*